Dec. 27, 1932.    E. R. EVANS    1,892,505
METHOD OF MAKING A SHOCK INSULATING DEVICE
Original Filed Aug. 24, 1925
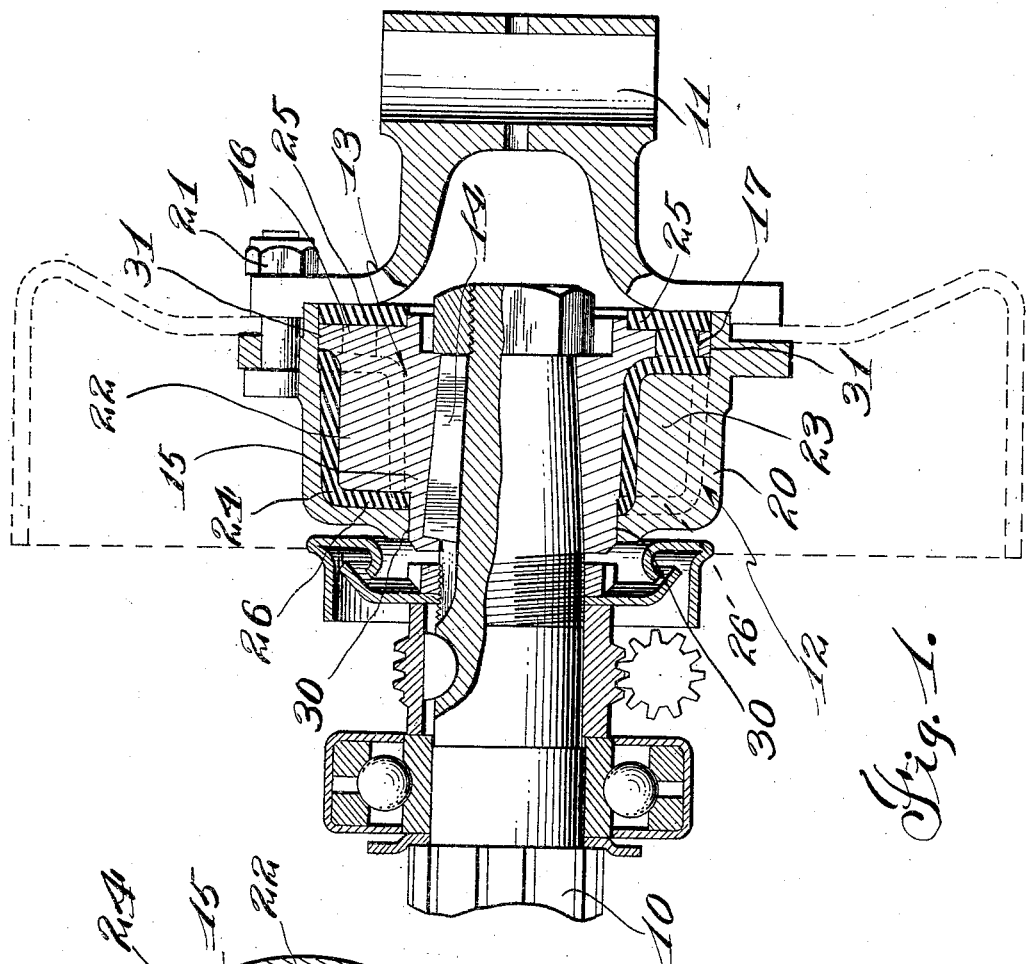
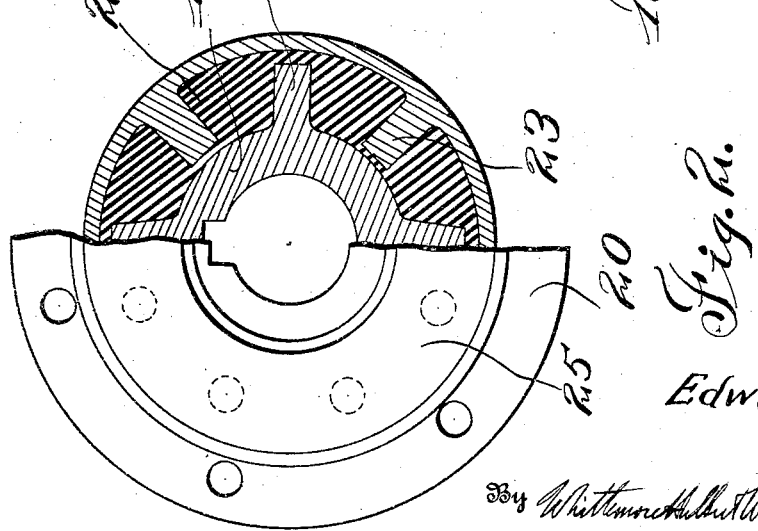
Inventor
Edwin R. Evans Patented Dec. 27, 1932

1,892,505

UNITED STATES PATENT OFFICE

EDWIN R. EVANS, OF DETROIT, MICHIGAN

METHOD OF MAKING A SHOCK INSULATING DEVICE

Original application filed August 24, 1925, Serial No. 52,183. Divided and this application filed October 22, 1928. Serial No. 314,271.

This invention relates to shock insulating or absorbing devices and has particular reference to a method of forming a shock insulating or absorbing device.

An object of this invention is to provide a method for forming a shock insulating device, which method may be economically practiced to produce a simple and efficient structure.

A still further object of this invention is to provide a method for forming a shock insulating device adapted to function as a coupling, which method will assure that all parts of the driving member will operate to drive the driven member.

This application is a division of my copending application, Serial No. 52,183 filed Aug. 24, 1925.

Other objects and advantages of this invention will become more apparent as the following description proceeds particularly when reference is had to the accompanying drawing wherein Figure 1 is a sectional view partly in elevation of a shock insulating device constructed in accordance with the teachings of this invention; and Figure 2 is an end elevational view partly in section of the structure shown in Figure 1.

In the drawing, the shock insulating device is shown as being located between the transmission spline shaft and the front universal joint connection of a motor vehicle, although it is to be clearly understood that the shock insulating device might be located at any point wherever it is desired to absorb rotational or axial shocks. Referring then particularly to the drawing wherein like reference characters designate corresponding parts throughout all views, the numeral 10 designates a transmission spline shaft which, in accordance with the usual practice, may be driven from an engine and transmission gearing (not shown). 11 designates the front universal joint connection which in accordance with the standard practice, is adapted to drive a propeller shaft (not shown), which shaft transmits power to the rear driving wheels of the vehicle. In order to absorb shocks and vibrations transmitted axially of the propeller shaft or transmission shaft 10, and to absorb the rotational shocks incident to the driving of the propeller shaft from the transmission shaft, there is provided a shock insulating device designated generally by the reference character 12. It is extremely important that all of the rotational shocks be fully absorbed and the device 12 is therefore adapted to entirely absorb these shocks.

The shock insulating device 12 includes an inner hub member designated generally by the reference character 13, keyed as at 14 to the transmission shaft 10. The hub member 13 is provided with the hub portion 15 and the annular base portion 16, the latter being provided with a circumferential series of openings 17 for a purpose hereinafter to be more clearly described.

Adapted to receive the hub member 13 is a driven casing member or front universal joint flange 20 adapted to be secured as by the bolts 21 to the front universal joint connection 11. The driving or hub member 13 and the driven member 20 are provided with the circumferentially spaced radial lugs 22 and 23 respectively, the lugs of one member extending into the recesses formed by the adjacent lugs of the other member as will be clearly apparent by reference to Figure 2. In order to form a resilient driving connection between the members 13 and 20, the spaces between the lugs 22 and 23 are filled with a resilient member or substance 24, this substance being preferably in the nature of a yieldable rubber-like material.

Obviously the substance 24 by being positioned between the lugs 22 and 23, will absorb all rotational shocks which might be transmitted from the transmission shaft 10 to the propeller shaft. To absorb the axial shocks which might be transmitted from the transmission shaft 10 to the propeller shaft or from the propeller shaft to the transmission shaft, the rubber-like material 24 is extended around the front and rear faces of the members 13 and 20 as designated at 25 and 26 respectively. Thus whenever there is a tendency for shocks and vibrations to be transmitted from the rear axles or rear wheels back through the propeller shaft and driving mechanism, such shocks or vibrations will be absorbed by reason of the resilient material 24 and will thus be prevented from reaching the transmission clutch and other parts of the engine.

For forming the shock insulating device above described, the members 13 and 20 may first be cast with their respective lugs 22 and 23, the lugs being so arranged that when the member 13 is positioned within the member 20 as illustrated in Figures 1 and 2, these lugs will be in interfering position with respect to each other. After the members 13 and 20 have been cast or otherwise formed, a quantity of rubber dough, in excess of that required to fill the interior of the casing or driven member 20, is placed in the cup-like driven member 20. The driving member 13 is then positioned within the driven member 20 and the rubber dough is then cured while the same is in position between these members.

Since an excess of rubber dough is placed within the member 20, the insertion of the member 13 within the member 20 causes the excess dough to escape through the openings 17 and to form the layer 25 of rubber-like material on the outer face of the annular base portion 16 of the hub member 13. Further the rubber-like substance completely covers all of the lugs 22 and 23 so that all of these lugs are completely enclosed by the said rubber-like substance. By virtue of the fact that the rubber-like substance is substantially locked with respect to the hub member 13, by virtue of its projection through the apertures 17, and since the lugs 23 on the member 20 are solidly embedded in the rubber-like substance, the latter serves to maintain the members 13 and 20 in their proper positions with respect to each other. Further, the ends of the member 20 form bearings for the ends of the member 13 as indicated at 30 and 31 whereby the members 13 and 20 are held in true concentric relation.

By curing the rubber dough after the same is positioned between the members 13 and 20, the rubber dough is caused to contact intimately with all of the surfaces of the said members 13 and 20. For this reason the members 13 and 20 need not be machined but need only be roughly cast since the rubber will find its way to all of the crevices. Thus the need of complicated dies is eliminated, it being possible to form the members 13 and 20 by using only holding rings and clamps. Further by virtue of the fact that the rubber is cured while it is between the members 13 and 20, the rubber is not placed under any initial strain whatsoever and after the curing operation is completed, the drive from the one member to the other will be by all of the lugs. In the usual constructions wherein the rubber is molded first and then inserted between the driving and driven members, it is substantially impossible to so accurately mold the rubber that it will have intimate and even contact with all portions of the members to be connected. Thus certain portions of the rubber are always placed under initial strain and certain of the lugs are compelled to do all of the driving, while the remaining lugs do little or no driving. By curing the rubber however while the same is between the members, the rubber finds its way to all of the crevices and provides a connecting medium having no portions under initial strain, thus assuring a positive drive by all of the lugs.

The members 13 and 20 are held in spaced relation to each other by the rubber-like substance 24, and these members are held in true concentric relation by the ends of the metal members 13 and 20 centering in each other as at 30 and 31. The metal to metal bearing surfaces at 30 and 31 may be extended and provided with bushings of anti-friction material to assure free rotation and long life if desired.

While the method has been described as being adapted to form a particular type of shock insulating or absorbing device, it will be immediately apparent that the method will find equal utility in forming any structure wherein it is desired to absorb axial or rotational shocks. The right is therefore reserved to make such changes in the steps of the method or in the structure produced thereby as will fall within the purview of the attached claim.

What I claim as my invention is:

The method of making a shock insulating device which consists in providing a hub member with a plurality of circumferentially spaced lugs, a bearing at one end, and an annular base at the other end forming a bearing and having a series of openings therein, providing a casing with a plurality of circumferentially spaced lugs and bearings at opposite ends thereof, placing an unmoulded mass of rubber dough in the casing member and inserting the hub member thereinto with the bearings on the hub member in engagement with the bearings on the casing member and with the lugs on one member staggered with relation to the lugs on the other member, moving said members relatively while guided by said bearings to completely fill the space enclosed by said members with the rubber dough and to extrude the excess rubber through the openings in said base and form a pad on the outer surface of said base, and subsequently curing the rubber dough to provide an integral shock absorbing member free of initial strain.

In testimony whereof I affix my signature.

EDWIN R. EVANS.